XXX-XXX

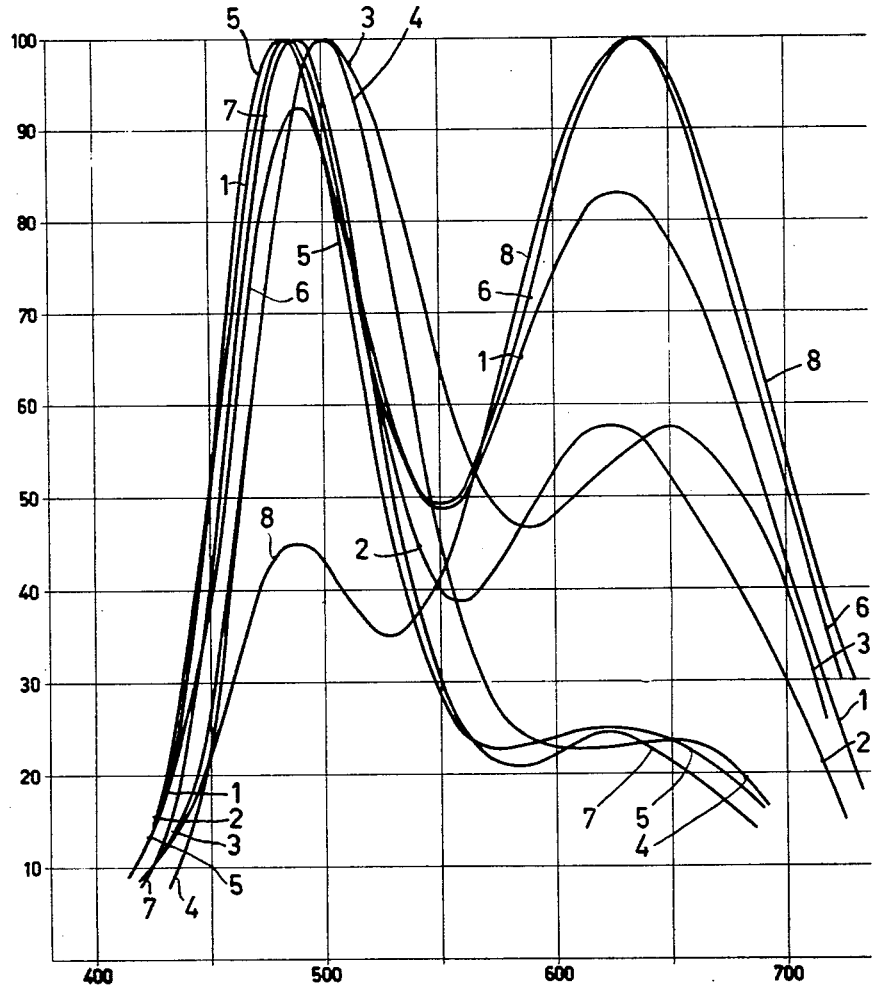

United States Patent Office 3,143,510
Patented Aug. 4, 1964

3,143,510
COPPER AND TIN ACTIVATED ORTHOPHOSPHATE PHOSPHORS
Willem Lambertus Wanmaker and Cornelis Bakker, Eindhoven, Netherlands, assignors to North American Philips Company, Inc., New York, N.Y., a corporation of Delaware
Filed May 16, 1960, Ser. No. 29,217
Claims priority, application Netherlands June 12, 1959
5 Claims. (Cl. 252—301.6)

The invention relates to a radiation source consisting of the combination of a mercury-vapor discharge lamp and a luminescent layer. The invention furthermore relates to a luminescent substance suitable for use in such a luminescent layer and to a method of producing such a substance.

In radiation sources of the kind set forth only a very small number of luminescent substances have been employed of late years, although many research efforts have been made to extend the number of substances suitable for use in such radiation sources. These investigations have yielded little result, which is accounted for by the fact that the substance to be used has to fulfill many severe requirements. One of the most important requirements is, of course, that the substances convert the ultraviolet radiation produced by the discharge into the desired radiation with high efficiency. If the radiation sources are to be used for illumination purposes, it will, moreover, be highly appreciated to have such a spectral distribution of the emitted light that the colors of the objects to be illuminated are reproduced with optimum fidelity, so that the human eye gets the same color impression as in daylight or in light from purely thermal radiators, for example, an incandescent lamp. For certain purposes deviations from the ideal spectral distribution may be admitted, it is true, in order to attain a better efficiency of the radiation sources, but these deviations are not allowed to be great.

It has been found that, for the aforesaid purpose, use may be made of a mixture of blue luminescing, antimony-activated calciumhalophosphate and a second substance, the emission of which has a peak in the long-wave part of the spectrum. To this end use is frequently made of calcium-metasilicate, activated with lead and manganese.

Instead of using the blue-luminescing calciumhalophosphate, use may be made of magnesium-tungstate.

The use of mixtures of luminescent substances involves disadvantages. If the constituents differ in granular size, demixing may occur during the application, so that the constituents are not uniformly distributed in the layer. If the constituents differ in hardness, the granular size of the constituents is likely to differ after grinding, since the constituents of lower hardness are sooner ground to fineness. Instead of the aforesaid mixtures calciumhalophosphate, activated with manganese and antimony, may be employed, since this substance has an emission peak not only in the blue part but also in the yellow part of the spectrum. Over a large part of the spectrum the emission of this substance is such that the color reproduction may be improved.

All the aforesaid substances have a satisfactory quantum efficiency and, moreover, a good lumen maintenance which is to be understood to mean that the decline in light output during the time the radiation sources are employed is small.

A radiation source according to the invention consists of the combination of a mercury vapor discharge lamp and a luminescent layer and is characterized in that this layer contains a luminescent substance activated by monovalent copper and bivalent tin and represented by the formula:

$$x\text{SrO} \cdot y\text{MeO} \cdot z\text{P}_2\text{O}_5 \cdot p\text{Cu}_2\text{O} \cdot q\text{SnO}$$

wherein Me designates the sum of the elements aluminum, magnesium, zinc, cadmium and boron, which substance fulfills the following conditions:

(a) $\qquad 2.5 < \dfrac{x+y+p+q}{z} < 3:0$ (b) $\qquad 0.001 < \dfrac{p}{2z} < 0.2$ (c) $\qquad 0.001 < \dfrac{q}{z} < 0.3$ (d) $\qquad 0.003 < \dfrac{y}{z} < 0.9$ (e) $\qquad 0.8 < \dfrac{2q}{p} < 4:5$ The explanation of the advantages inherent in the use of the luminescent substances fulfilling the aforesaid formula and conditions is given in the following.

In the emission spectrum of mercury vapor discharge tubes fairly intensive lines are found in the visible part of the spectrum at 404, 436, 546 and 578 m$\mu$. Most of the luminescent substances do not convert a radiation of these wavelengths into different radiation or convert it only to a small extent. This results in that in the radiation source consisting of the combination of a mercury vapor discharge tube and a luminescent layer light is emitted at the aforesaid wavelengths, emanating from the mercury vapor discharge itself. The total intensity of the light at these wavelengths, which emanates in common from the discharge, and of the luminescent substance is therefore often higher than is desired for a satisfactory color reproduction. By using filters, for example, part of the radiation of these wavelengths may be absorbed, so that an excessively great intensity of the emitted radiation is avoided. However, the use of filters is a disadvantage, since the manufacture of the radiation source becomes more complicated.

The copper- and tin-activated substances used in a radiation source according to the invention and fulfilling the aforesaid formula and conditions have an emission which exhibits a peak both in the blue and in the red part of the spectrum, so that they ensure a satisfactory color reproduction. The peak in the blue spectrum part is produced by the copper activation and the peak in the red part by the tin activation. The particular advantage of these substances is that at the aforesaid four critical wavelengths a small quantity of light is emitted.

In a prior patent application, not yet published, phosphates of strontium and one or more of the elements aluminum, magnesium, zinc, cadmium and boron are described, which are activated by copper and manganese. Owing to the copper activation these substances produce substantially the same emission in the blue spectrum part as the substances for use in the radiation source according to the invention. The manganes activation produces an emission peak in the red part of the spectrum, so that also the substances according to the said prior application are capable of ensuring a fairly good color reproduction. The emission curves of the substances used in a radiation source according to the invention have, however, in the red spectrum part, an even more favorable shape and the emission peak lies at an even more favorable place than with manganese-activation. The peak of the emission curve in the red spectrum part lies at a higher wavelength than the peak of the emission curve obtained by manganese activation. This is conducive to a satisfactory color reproduction of red-colored objects. In the case of tin activation the range enclosed by the curves in the red spectrum part is wider than with magnanese-activation, i.e. the curves have less steep flanks than the emission curves in the red spectrum part due to manganese-activation. Apparently, this will give rise to the risk that at the wavelengths of 546 and 578 m$\mu$ the intensity of the emission of the copper- and tin-activated substances would exceed that of the copper- and manganese-activated substances. However, since the peak of the emission curves in the red spectrum part for the copper- and tin-activated substances lies at higher wavelengths than with the copper- and manganese-activated substances, this risk does not occur. The advantages of the copper- and manganese-activated substances, i.e. the low emission at the wavelengths of 546 and 578 m$\mu$, are maintained and, in addition, an improved color reproduction is ensured owing to the wider course of the emission curves in the red spectrum part of the copper- and tin-activated substances, since on the longwave side of the red part of the spectrum a greater radiation is emitted.

When using aluminum in the substances for use in a radiation source according to the invention the emission peak is produced in the red spectrum part at a slightly higher wavelength than with the use of the elements magnesium, zinc, cadmium or boron. Use may be made of one of these elements, but also of a mixture of any number thereof. In the red spectrum part substantially no displacement of the emission peak is produced in this way.

With the same ratio between copper and tin and the same molar quantity of the elements aluminum, magnesium, zinc, cadmium or boron, the height of the peak in the red spectrum part depends upon the selected element. Magnesium yields the highest peak value.

With respect to the various, aforesaid conditions, the following should be observed.

If the value of $$\frac{p}{2z}$$

drops below 0.001, the absorption of the ultraviolet rays becomes too small to provide a useful luminescence. If the value exceeds 0.2 concentration quenching frequently occurs or difficulties arise at the introduction of the copper into the crystal lattice, so that brown products are obtained.

If $$\frac{y}{z}$$

drops below 0.003, no practically serviceable luminescence occurs; if $$\frac{y}{z}$$

exceeds 0.9 the powders are very likely to become too hard during manufacture, so that grinding will take much time and energy.

If $$\frac{q}{z}$$

drops below 0.001, no serviceable luminescence occurs; if $$\frac{q}{z}$$

exceeds 0.3, concentration quenching is likely to occur. If $$\frac{2q}{p}$$

drops below 0.8, the emission of the substances is too blue and if $$\frac{2q}{p}$$

exceeds 4.5, the emission is too red.

The best products are obtained, if the conditions:

(a) $\quad 2.5 < \frac{x+y+p+q}{z} < 3.0$ (b) $\quad 0.01 < \frac{p}{2z} < 0.05$ (c) $\quad 0.018 < \frac{q}{z} < 0.15$ (d) $\quad 0.06 < \frac{y}{z} < 0.4$ (e) $\quad 1.8 < \frac{2q}{p} < 3.0$ are fulfilled.

Where in the following reference is made to the light output of the various substances, this is to be understood to mean the light output obtained at the impact of a radiation of a wavelength of 253.7 m$\mu$, expressed in the percentage of the light output of a blue luminescing calciumhalophosphate, activated only by antimony. Since the substances of the radiation source according to the invention exhibit blue and red emissions, the light output will be relatively lower according as the red emission increases with respect to the blue emission. The blue emission of the calciumhalophosphate activated only by antimony is chosen, however, as a standard for comparison, since this substance can be manufactured in a very satisfactorily reproduceable manner and has a constant light output for a very long time.

The temperature-dependence of the luminescence of the substances according to the invention is satisfactory, which means that the difference between the intensity of the emitted radiation at room temperature and that at temperatures of 200° to 250° C. is small. It is thus possible to employ these substances also at those places where the temperature attains such high values, for example, on the bulb surrounding a high-pressure mecury-vapor discharge tube.

Since the copper must be present in the substances according to the invention in its monovalent form and the tin in its bivalent form, it is necessary to carry out the manufacture in a non-oxidizing, for example, in a reducing atmosphere. Suitable atmospheres are, for example, nitrogen or a mixture of nitrogen and hydrogen. The temperature at which the manufacture takes place is chosen to lie between 1000° C. and 1250° C. The duration of firing depends upon the reactivity of the starting materials used and hence, inter alia upon their granular size. It is preferably chosen between one and two hours. Sometimes better products are obtained, if the firing process is carried out in various steps. In this case, the fired product may be refined and mixed intermediately between the various steps. The total time of firing then is somewhat longer, for example, 3 hours.

For introducing the various elements into the luminescent substances to be obtained highly different starting substances may be chosen. Suitable compounds are, for example, the oxides, carbonates, fluorides, phosphates and sulphates. Particularly for the introduction of the element strontium use may be made of a mixture of strontium hydrophosphate ($SrHPO_4$) and strontium carbonate ($SrCO_3$); in this case the element strontium and the required phosphate groups are introduced simultaneously by using a single compound. The strontium carbonate is then required to obtain the correct ratio of strontium with respect to the phosphate groups in the final substance. Moreover, such a mixture develops only a small amount of gas, which would indeed be the case, if a mixture of strontium carbonate and diammonium phosphate would be used as a starting material, which would also be possible.

The invention will now be described with reference to a few examples and to a drawing.

The drawing shows a graph of the emission curves of various substances manufactured in accordance with the following examples. On the abscissa of the graph is plotted the wavelength in millimicrons and on the ordinate of the graph is plotted the relative intensity of the emitted radiation for an impact of a radiation having a wavelength of 253.7 m$\mu$. The highest peak of each curve is put at 100 in order to permit a satisfactory comparison of the curves. In order to give an impression of the light output of the various substances this is indicated hereinafter with each example in a percentage of the light output of blue luminescing, antimony-activated calciumhalophosphate, as indicated above.

The manufacture of the substances of the following examples is the same for all substances. A mixture of the starting substances is produced in the quantities indicated in each example, which mixture is deposited in Alundum boats. These boats are heated in a furnace at a temperature between 1000° and 1250° C., whilst a flow of gas consisting of nitrogen or a mixture of nitrogen and hydrogen is passed through the furnace. After one to two hours' stay in the furnace the products are caused to cool down in the flow of gas. After cooling the luminescent substance obtained is ground to fineness and, if necessary, sieved. The substance is then ready for use in a radiation source according to the invention.

In each of the following examples the conditions described above $a$, $b$, $c$, $d$ and $e$ are indicated:

*Example I*

36.96 g. of SrHPO$_4$
0.75 g. of CuSO$_4$.5 aq.
0.90 g. of SnO$_2$
0.62 g. of H$_3$BO$_3$
2.82 g. of MgCO$_3$
9.32 g. of SrCO$_3$ $a=2.90$, $b=0.03$, $c=0.06$, $d=0.40$, $e=2.0$.

The spectral distribution of the emission is indicated in the drawing by the curve 1. The light output is 56%.

*Example II*

36.96 g. of SrHPO$_4$
0.75 g. of CuSO$_4$.5 aq.
0.45 g. of SnO$_2$
0.62 g. of H$_3$BO$_3$
2.82 g. of MgCO$_3$
9.77 g. of SrCO$_3$ $a=2.90$, $b=0.03$, $c=0.03$, $d=0.40$, $e=1.0$.

The spectral distribution is indicated in the drawing by the emission curve 2. The light output is 74%.

*Example III*

36.96 g. of SrHPO$_4$
0.75 g. of CuSO$_4$.5 aq.
0.90 g. of SnO$_2$
0.51 g. of Al$_2$O$_3$
10.37 g. of SrCO$_3$ $a=2.90$, $b=0.03$, $c=0.06$, $d=0.10$, $e=2.0$.

The spectral distribution is indicated in the drawing by the emission curve 3. The light output is 48%.

*Example IV*

36.96 g. of SrHPO$_4$
0.75 g. of CuSO$_4$.5 aq.
0.90 g. of SnO$_2$
5.17 g. of CaCO$_3$
8.12 g. of SrCO$_3$ $a=2.90$, $b=0.03$, $c=0.06$, $d=0.30$, $e=2.0$.

The spectral distribution is indicated in the drawing by the emission curve 4. The light output is 43%.

*Example V*

36.96 g. of SrHPO$_4$
1.50 g. of CuSO$_4$.5 aq.
0.90 g. of SnO$_2$
2.82 g. of MgCO$_3$
7.67 g. of SrCO$_3$ $a=2.90$, $b=0.06$, $c=0.06$, $d=0.30$, $e=1.0$.

The spectral distribution is indicated in the drawing by the emission curve 5. The light output is 20%.

*Example VI*

36.96 g. of SrHPO$_4$
0.75 g. of CuSO$_4$.5 aq.
0.90 g. of SnO$_2$
2.82 g. of MgCO$_3$
8.12 g. of SrCO$_3$ $a=2.90$, $b=0.03$, $c=0.06$, $d=0.30$, $e=2.0$.

The spectral distribution is indicated in the drawing by the emission curve 6. The light output is 68.%

*Example VII*

36.96 g. of SrHPO$_4$
1.50 g. of CuSO$_4$.5 aq.
0.90 g. of SnO$_2$
2.44 g. of ZnO
7.67 g. of SrCO$_3$ $a=2.90$, $b=0.06$, $c=0.06$, $d=0.30$, $e=1.0$.

The spectral distribution is indicated in the drawing by the emission curve 7. The light output is 30%.

*Example VIII*

36.93 g. of SrHPO$_4$
0.75 g. of CuSO$_4$.5 aq.
0.90 g. of SnO$_2$
2.44 g. of ZnO
8.12 g. of SrCo$_3$ $a=2.90$, $b=0.03$, $c=0.06$, $d=0.30$, $e=2.0$.

The spectral distribution is indicated in the drawing by the emission curve 8. The light output is 60%.

*Example IX*

36.93 g. of SrHPO$_4$
0.75 g. of CuSO$_0$.5 aq.
0.45 g. of SnO$_2$
2.44 g. of ZnO
8.57 g. of SrCO$_3$ $a=2.90$, $b=0.03$, $c=0.03$, $d=0.30$, $e=1.0$.

The spectral distribution is substantially equal to that of Example VIII. The light output is 72%.

It appears from the examples that the starting material may contain CuSO$_4$, in which the copper is bivalent. In this case heating may also take place in a neutral atmoshpere, for example, nitrogen, since the CuSO$_4$ decomposes into monovalent Cu$_2$O.

From the examples and from the associated emission curves it is furthermore evident what influence the choice of certain elements and the relative molar ratio between these elements exert on the emission.

The influence of the increase in tin content with respect to the copper content appears from the fact that with an increase in the tin content in the substances of the Examples VI or VII to 0.09 and 0.12 the color of the emitted radiation constantly becomes redder.

What is claimed is:

1. A luminescent substance, activated by monovalent copper and bivalent in and represented by the formula:

$$x\text{SrO}.y\text{MeO}.z\text{P}_2\text{O}_5.p\text{Cu}_2\text{O}.q\text{SnO}$$

wherein Me designates at least one element selected from the group consisting of aluminum, magnesium, zinc, cadmium and boron, which substance fulfills the following conditions:

(a) $$2.5 < \frac{x+y+p+q}{z} < 3.0$$

(b) $$0.001 < \frac{p}{2z} < 0.2$$

(c) $$0.001 < \frac{q}{z} < 0.3$$

(d) $$0.003 < \frac{y}{z} < 0.9$$

(e) $$0.8 < \frac{2q}{p} < 4.5$$

2. The luminescent substance of claim 1 wherein the following conditions are fulfilled:

(a) $$2.5 < \frac{x+y+p+q}{z} < 3.0$$

(b) $$0.01 < \frac{p}{2z} < 0.05$$

(c) $$0.018 < \frac{q}{z} < 0.15$$

(d) $$0.06 < \frac{y}{z} < 0.4$$

(e) $$1.8 < \frac{2q}{p} < 3.0$$

3. A method of producing the luminescent substances of claim 1, wherein compounds of strontium, copper and tin and that of at least one of the elements selected from the group consisting of aluminum, magnesium, zinc, cadmium and boron, including at least one phosphate in the required proportions, are heated in a non-oxidizing atmosphere at a temperature between 1000° C. and 1250° C. for one to two hours.

4. The method of claim 3, wherein for the introduction of the element strontium and of the phosphate groups use is made of a mixture of strontium hydrophosphate and strontium carbonate.

5. The method of claim 4 wherein for the introduction of the copper, use is made of copper sulphate, and heating takes place in a neutral atmosphere.

References Cited in the file of this patent
UNITED STATES PATENTS

| | | |
|---|---|---|
| 2,664,401 | McKeag et al. | Dec. 29, 1953 |
| 2,919,365 | Butler et al. | Dec. 29, 1959 |
| 2,986,529 | McKeag et al. | May 30, 1961 |

OTHER REFERENCES

Chemical Abstracts article, Fluorescent Orthophosphates, vol. 52, 1958, pages 8754i and 8755a and b.

UNITED STATES PATENT OFFICE
CERTIFICATE OF CORRECTION

Patent No. 3,143,510                                         August 4, 1964

Willem Lambertus Wanmaker et al.

It is hereby certified that error appears in the above numbered patent requiring correction and that the said Letters Patent should read as corrected below.

Column 6, line 72, for "in" read -- tin --.

Signed and sealed this 8th day of December 1964.

(SEAL)
Attest:

ERNEST W. SWIDER                                      EDWARD J. BRENNER
Attesting Officer                                           Commissioner of Patents